United States Patent [19]

Bryden

[11] 4,251,755
[45] Feb. 17, 1981

[54] CRT DIGITAL BRIGHTNESS CONTROL

[75] Inventor: Joseph E. Bryden, Framingham, Mass.

[73] Assignee: Raytheon Company, Lexington, Mass.

[21] Appl. No.: 56,766

[22] Filed: Jul. 12, 1979

[51] Int. Cl.³ ............................................. H01J 29/72
[52] U.S. Cl. ................................... 315/383; 315/367; 340/742; 340/793
[58] Field of Search ................................ 315/367, 383; 340/347 AD, 742, 793

[56] References Cited

U.S. PATENT DOCUMENTS 3,527,980  9/1970  Robichaud et al. ................. 315/367
3,718,832  2/1973  Premru et al. ...................... 315/367
3,996,673  12/1976 Vorst et al. ......................... 340/742

Primary Examiner—Theodore M. Blum
Attorney, Agent, or Firm—William R. Clark; Milton D. Bartlett; Joseph D. Pannone

[57] ABSTRACT

A digitally controlled CRT display system providing display intensity levels having equal ratios of luminances for consecutive steps over a plurality of brightness control settings. The digital video is added to a digital brightness code and the sum is converted to an analog signal that is coupled to the cathode of the CRT. The digital-to-analog converter provides a transfer characteristic such that the consecutive gray shade steps have a constant ratio of luminance.

18 Claims, 4 Drawing Figures

CRT DIGITAL BRIGHTNESS CONTROL

BACKGROUND OF THE INVENTION

There are many applications for display systems embodying cathode ray tubes (CRT) which are driven by digitally controlled video. Typically, a computer may provide three bits of digital control with 000 corresponding to the background, 111 corresponding to the brightest shade, and 001 to 110 corresponding to six gray shades in between. From a subjective visual consideration, it is very desirable that all of the consecutive gray shade steps exhibit the same contrast. In other words, it is important that the eye distinguish between gray shade levels graded uniformly. Subjectively, equal changes in contrast require equal ratios of luminance. In computer driven display systems, $\sqrt{2}$ is a typical ratio because it provides adequately distinguishable gray shades. Using $\sqrt{2}$ as an example, that means that if a given level, $L_i$, has a luminance of 1.0 foot-Lamberts (FT-L), the next brighter level, $L_{i+1}$, would have a luminance of 1.4 FT-L. Also, $L_{i+2}$ would have a luminance of 2.0 FT-L, etc.

Generally, the digital code is converted to an analog signal that is used as a drive voltage for the cathode of the CRT and a negative bias voltage is supplied to the grid. In general, a typical CRT transfer characteristic of cathode voltage versus brightness is such that for constant input changes in drive voltage, the changes in luminance are not at a fixed ratio. That is, the transfer characteristic is not ideally logarithmic. More specifically, the cathode current of a CRT may usually be expressed by the equation $$I_C = k V_d^\psi V_C^\epsilon$$

where k is a CRT system constant and is often called the "modulation constant;" $V_d$ is the drive voltage; $V_C$ is the cut-off voltage; $\psi$ is an exponent often called the "gamma" of the modulation characteristic; and $\epsilon$ is an exponent ($\psi + \epsilon = 3/2$). Furthermore, with a typical CRT, brightness is not simply related to cathode current. Rather, at high beam currents, aperture losses increase due to beam-bundle spread. Also, at high brightness, the phosphor efficiency decreases due to saturation effects. Thus, in a given system, the transfer characteristic of a CRT is typically quite non-linear and not defined with adequate accuracy by a simple law. It follows that there is a problem converting the digital codes to analog signals that provide equal changes in contrast between the consecutive gray shade steps.

The problem is made much more complex by the fact that in most operational systems, it is desirable to adjust a brightness control so that the tube luminance is optimized for the ambient light level of the environment. As the brightness is adjusted, which is commonly provided by changing the direct current bias to the grid, the operating window of gray shade levels on the transfer characteristic is moved along the non-linear curve. Accordingly, to maintain equal changes in contrast between the consecutive gray shade steps as the brightness is adjusted, the ratios of luminance for consecutive gray shade steps must be fixed over the entire operating curve rather than just a portion of it. The reason that it is desirable to adjust the brightness to be optimum for the ambient light level of the environment is that if the display is too bright with respect to the operational room, increased glare causes operator eye strain decreasing efficiency; also, if the display is too dim with respect to the room, the operator's visual adaptive time after looking around the room is greatly increased. It has been found that operator errors increase as the display becomes too bright or too dim with respect to the brightness of the room. Due to practical considerations, the ambient light level of many operational rooms varies through the course of a day and with functional usage resulting in the desirability of brightness adjustments.

SUMMARY OF THE INVENTION

The invention discloses means for producing a digital signal derived from two digital signals, one signal corresponding to information to be displayed on a cathode ray tube and the other signal corresponding to the intensity of the cathode ray tube. The derived digital signal is coupled through a digital-to-analog converter to the cathode ray tube. The analog output of the converter has an amplitude that is related by a non-linear transfer function to the derived digital signal at its input. The producing means may comprise a digital adder in which case the derived digital signal is the sum of the two digital signals from which it is derived. Preferably, the signal corresponding to information to be displayed may be supplied by a digital computer and the signal may be used in raster scan or cursive writing on the cathode ray tube. It is preferable that the non-linear transfer function be such that the discrete analog voltages when coupled to the cathode ray tube produce discrete gray shade or intensity levels, the consecutive steps of which have subjective equal contrast.

The invention may also be practiced by the combination of a cathode ray tube display and means responsive to digital video signals for producing a plurality of discrete intensity levels on the display wherein the producing means comprises means for maintaining the ratios of luminances of adjacent intensity levels substantially constant. Adjacent intensity levels for a given level in the range of levels are defined as the pair of levels, one above and one below in intensity, having the closest value of luminance to the given level. Preferably, the producing means comprises a digital-to-analog converter wherein the amplitude of the analog output is related by a non-linear transfer function to the digital video input signals. More specifically, it is preferable that the converter provide analog voltages which when coupled to the display produce discrete gray shade levels characterized as having intensity level consecutive steps of substantially equal ratios of luminance. A consecutive step is defined to include two adjacent intensity levels. In other words, if the gray shades were arranged into a scale, the ratios of luminances for bordering gray shades would be substantially equal. Furthermore, the producing means may preferably comprise means for maintaining the described ratios of luminances equal for a plurality of display brightness settings.

More specifically, the invention may be practiced by a digitally controlled video display system comprising a cathode ray tube display and means coupled to it for deriving a plurality of analog video signals from a plurality of digital signals each of which corresponds to a gray shade level to be displayed wherein the analog signal produces gray shade levels with consecutive steps having substantially equal ratios of luminances. The deriving means comprises a digital adder adapted for input of digital video signals and brightness encoded digital signals. Furthermore, the deriving means comprises means for converting the digital output signal of the adder to an analog signal. It is preferable that the deriving means further comprises means for maintaining the described ratios equal for a plurality of the brightness encoded digital signals.

BRIEF DESCRIPTION OF THE DRAWINGS

The foregoing and other objects and advantages of the invention will be understood more fully in the following detailed description thereof with reference to the accompanying drawings wherein.

DESCRIPTION OF THE PREFERRED EMBODIMENT

Figure 1:
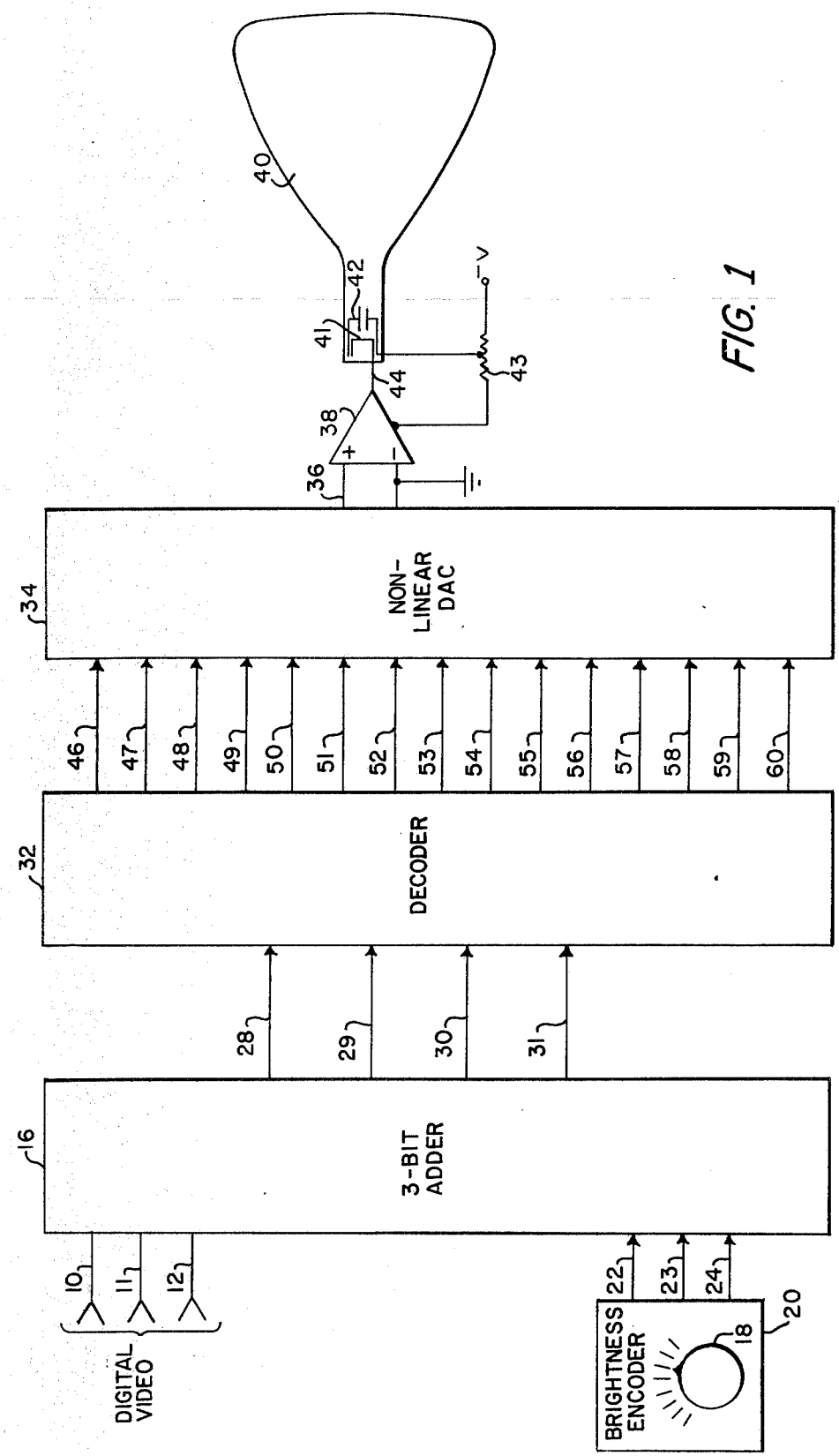
FIG. 1 is a schematic block diagram of a system embodying the invention.

Referring to FIG. 1, a digital display system with a basic embodiment of the invention is shown. The digital video is input into conventional 3-bit adder 16 on lines 10–12. Typically, the digital video would be provided by a computer and would be used with raster scan or cursive writing. Although the depicted circuit provides for the input of a three bit digital code corresponding to eight possible writing levels, more or fewer bits could be used for the code. A three-bit digital brightness code is input to adder 16 on lines 22–24. Accordingly, the brightness may be adjusted in eight discrete levels. The adjustment of brightness is accomplished by the operator turning brightness control knob 18 which is coupled to brightness encoder 20 which provides a three bit code which is a function of the rotational position of control knob 18. An example of an adder is an SN54283 which is a 4-bit adder, three bits of which would be used for system described herein. Brightness encoder 20 may be an eight position switch connected to provide digital encoding on lines 22–24. The clocking rate of the digital data in some applications may be 50 MHz or higher. Adders, in general, are not fast enough for use with data rates on this order so an alternate embodiment will be described later herein.

Adder 16 provides the addition of the three bit digital video and three bit brightness code. This, in essence, functions to encode the operator selected brightness into the digital video. More specifically, for each of the eight possible levels of digital video, there are eight possible levels at the output of adder 16 depending on the brightness control setting. For example, if brightness encoder 20 provides a digital value of 4 to adder 16 on line 22, all digital video on lines 10–12 is increased by a digital value of 4 at the output of adder 16. Accordingly, the output of adder 16 on lines 28–31 corresponds to a dynamic range of 16 possible video levels that have been encoded with brightness information.

Conventional decoder 32 functions to accept as input 4 parallel bits on lines 28–31 containing brightness encoded digital video and provide as an output a logical 1 on the appropriate level line. Fifteen output level lines 46–60 are shown representing the overall dynamic range; a line is not provided for the sixteenth possible level of 0000. An example of a decoder is an SN74154.

Figure 2:
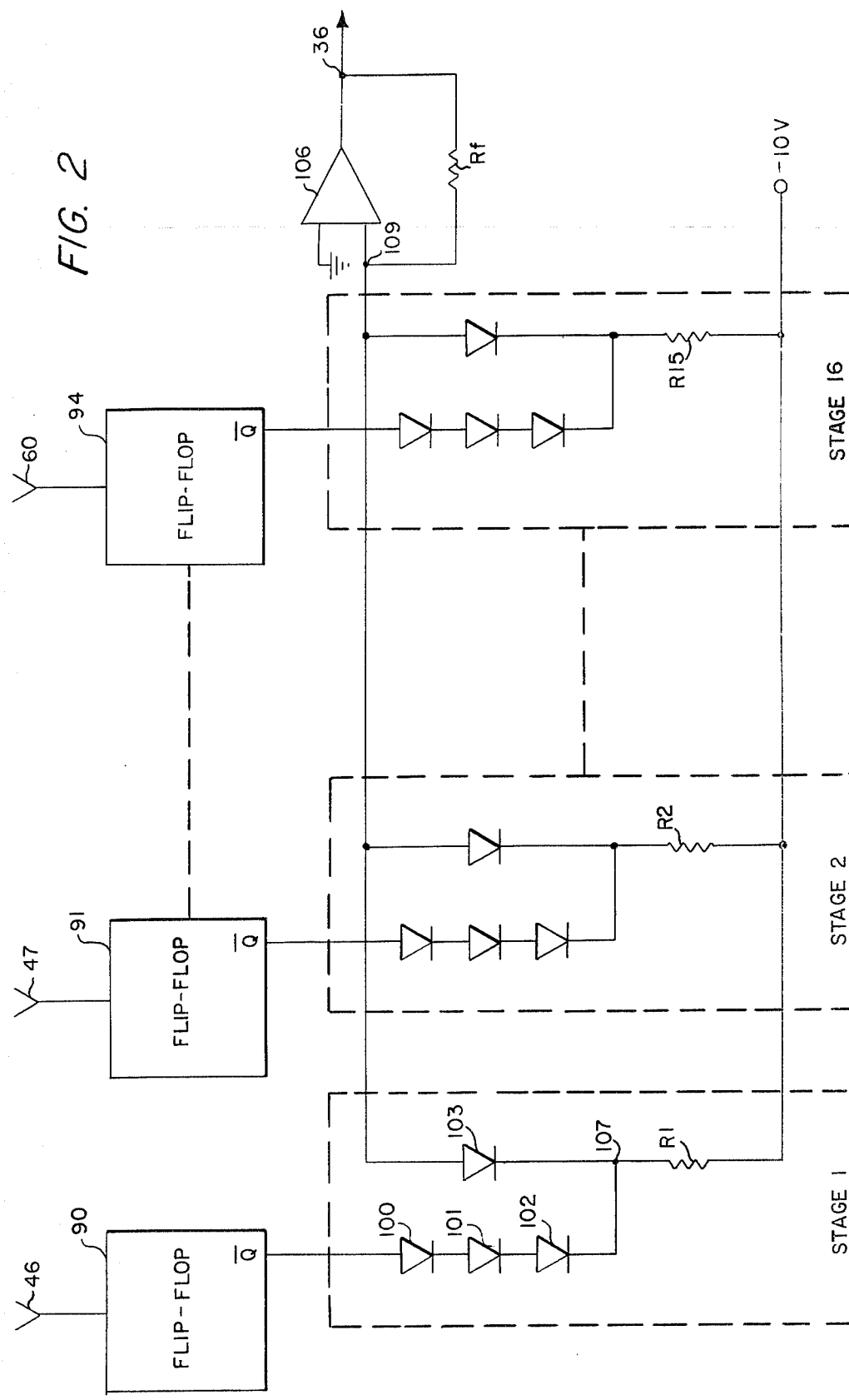
FIG. 2 is a detailed schematic of the non-linear DAC of FIG. 1.

Non-linear digital-to-analog converter (DAC) 34 which will be described in more detail with reference to FIG. 2, provides an analog output on line 36 to the positive input terminal of conventional operational amplifier 38. In general, the transfer characteristic of non-linear DAC is such that for a logical 1 on any of the 15 input lines, a unique analog voltage is provided on output line 36 and the 15 possible output voltages are such that when coupled through amplifier 38 to the cathode 41 of CRT 40, they produce gray shade levels with consecutive steps having equal ratios of luminance. For any particular brightness control knob 18 setting, eight gray shade levels may be produced by the digital video.

As stated, the output of nonlinear DAC 34 on line 36 is connected to the positive input terminal of conventional amplifier 38. Typically, amplifier 38 provides a voltage gain by a factor of approximately 6 although this parameter may vary from application to application. Accordingly, input voltages on line 36 in the range from 0 to 10 V will be amplified to the range from 0 to 60 V. The output of amplifier 38 is connected to te cathode 41 of CRT 40. The grid 42 is connected through the wiper of potentiometer 43 to a negative V supply, typically −100 V. For many CRT's, it is preferable that the voltage applied to the grid be approximately −60 V. Other essential connections of an operating CRT such as, for example, high voltage, focus, filament, and deflection coils are not shown. An example of a CRT is a Raytheon Company CK1471.

The system so described with reference to FIG. 1 provides a significant improvement over the prior art in providing a digital video display system wherein the brightness may be adjusted while maintaining the same contrast ratio between consecutive gray shade steps. In prior art systems, the contrast ratios between the gray shades were not consistent for each brightness setting. Furthermore, for each brightness change, the bias and video gain had to be adjusted to optimize the contrast steps. Even with these adjustments, the uniformity of contrast steps was not adequate for many applications.

Figure 3:
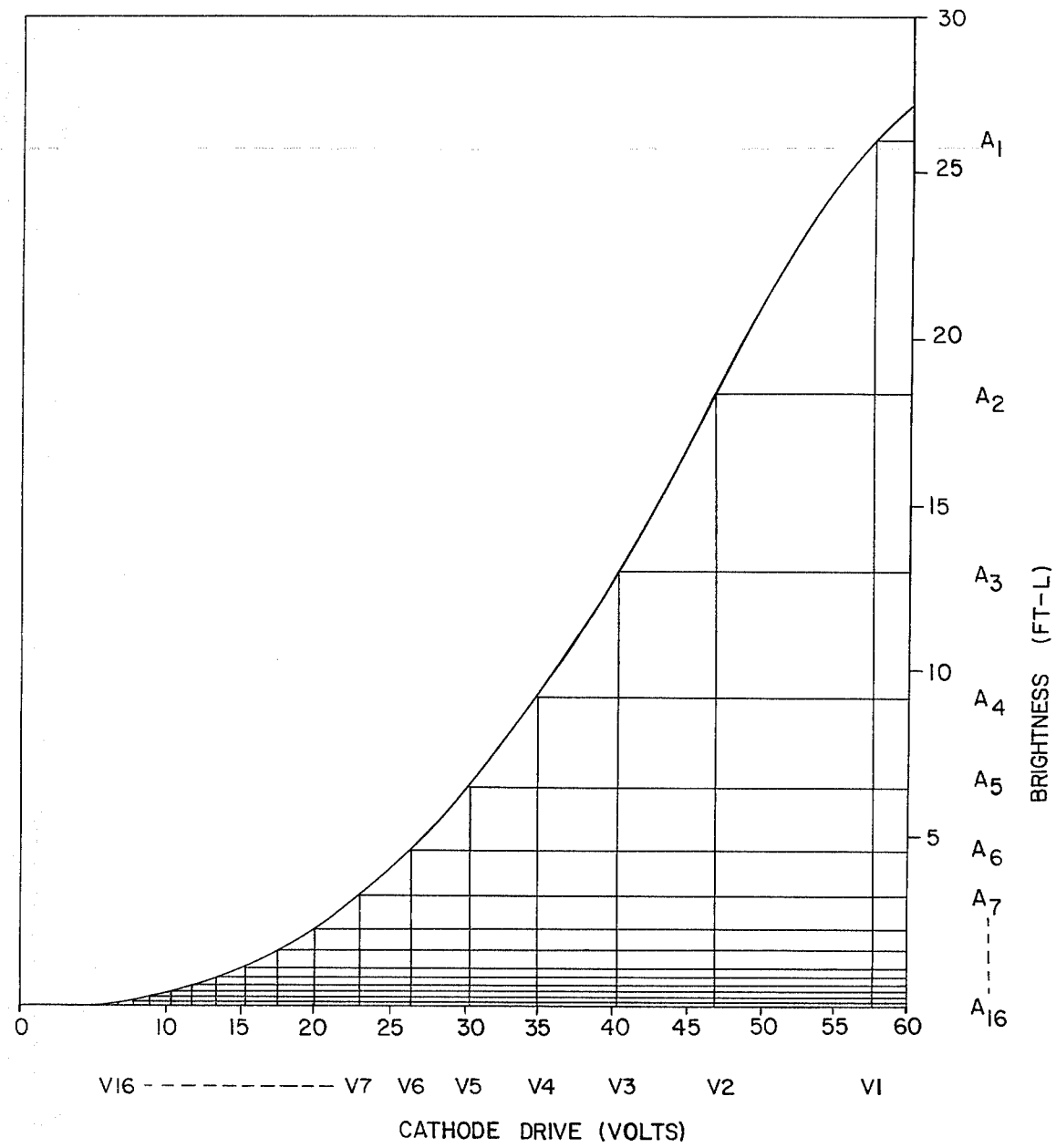
FIG. 3 is plot of the transfer characteristic of a typical CRT.

Referring to FIG. 3, a plot is shown which details the transfer characteristic of a typical CRT. The ordinate is cathode drive in volts which is added to the DC bias which for a typical tube may be on the order of −60 volts. The abscissa is brightness in FT-L. It is shown that for brightness levels $A_1$–$A_{16}$ which are in the desired ratio increments of $\sqrt{2}$, the input cathode drive voltages $V_1$–$V_{16}$ must be provided on line 44 from the output of operational amplifier 38. For example, for the brightest level $A_1$ which is indicated by a digital video code of 111 on lines 10–12 and a brightness code of 111 on lines 22–24 (corresponding to 1111 on lines 28–31 and a logical 1 on line 46), DAC 34 will provide a voltage which when coupled through amplifier 38, provides 57.5 volts on line 44. Further, for the second brightest level, $A_2$, which may be indicated by a digital video code of 110 on lines 10–12 and a brightness code of 111 on lines 22–24 (corresponding to 1110 on lines 28–31 and a logical 1 on line 47), DAC 34 will provide a voltage which when coupled through amplifier 38, provides 47 volts on line 44.

Referring to FIG. 2, a detailed schematic of DAC 34 of FIG. 1 is shown. Other circuits providing the same characteristics will be obvious to those skilled in the art. Conventional flip-flops 90, 91 and 94 are representative of 15 flip-flops to which are connected input lines 46–60. More specifically, input line 46 is connected to flip-flop 90, input line 47 is connected to flip-flop 91, input line 60 is connected to flip-flop 94, and input lines 48-59 are connected to 12 other flip-flops that are not shown. As each stage (1, 2 ... 15) is identical except for the selection of resistor $R_n$ where n is an integer from 1 to 15, the operation of FIG. 2 will be described only with reference to stage 1 as labeled. The input on line 46 is either a logical 0 or 1 with the 1 corresponding to a digital video of 111 and a brightness encoder output of 111. Flip-flop 90 is clocked at the digital video data rate and functions as a latch to hold the digital level of line 46 for one clock pulse. A logical 1 on line 46 results in a logical 0 on the $\overline{Q}$ output; a logical 0 on line 46 results in a logical 1 on the $\overline{Q}$ output. If $\overline{Q}$ is a logical 1 (approximately 4.0 volts), diodes 100-102 are forward biased and current flows from flip-flop 90 through $R_1$ to a stabilized $-10$ V source. With the voltage drops across diodes 100-102, junction 107 is held at approximately 2.0 V which back biases diode 103, which, for example, is a 1N4148. Therefore, when $\overline{Q}$ is a logical 1, no current flows from conventional differential amplifier 106. The result is that there is no voltage contribution on line 36 when $\overline{Q}$ is a logical 1. Differential amplifier 106 clamps junction 109 to a virtual ground so that junction 107 cannot go more negative than approximately $-0.7$ volts, the voltage drop across diode 103. Therefore, when $\overline{Q}$ of flip-flop 90 is a logical 0 (approximately 0.6 volts), diodes 100-102 are back biased. Accordingly, when $\overline{Q}$ of flip-flop 80 is a logical 0, current flows from differential amplifier 106 through diode 103 and resistor $R_1$ to the $-10$ V source. This current causes the generation of a voltage on line 40 which is approximately given by the equation $$E_o = - \frac{R_f}{R_1 + R_d} (E_i + E_d)$$

where $R_f$ is the resistance across the differential amplifier, $R_d$ is the resistance of diode 103, $E_i$ is the $-10$ V supply, and $E_d$ is the voltage drop across diode 103 which is approximately 0.7 V.

The selection of the values for resistors $R_n$ may vary from system to system depending on the transfer characteristic of the CRT and the amplifier or amplifiers used. Using the transfer characteristic of FIG. 3 as an example, and assuming that operational amplifier 38 has a voltage gain of 6, the values of $R_n$ can be calculated. For example, for $V_1$ of FIG. 3 where there is a requirement to provide 57.5 volts on line 44, if $R_f$ is 1000 ohms and the internal resistance of diode 103 is 20 ohms, $R_1$ would be approximately 950 ohms. Also, for $V_2$, where 47 volts must be supplied, $R_2$ would be approximately 1187 ohms.

Figure 4:
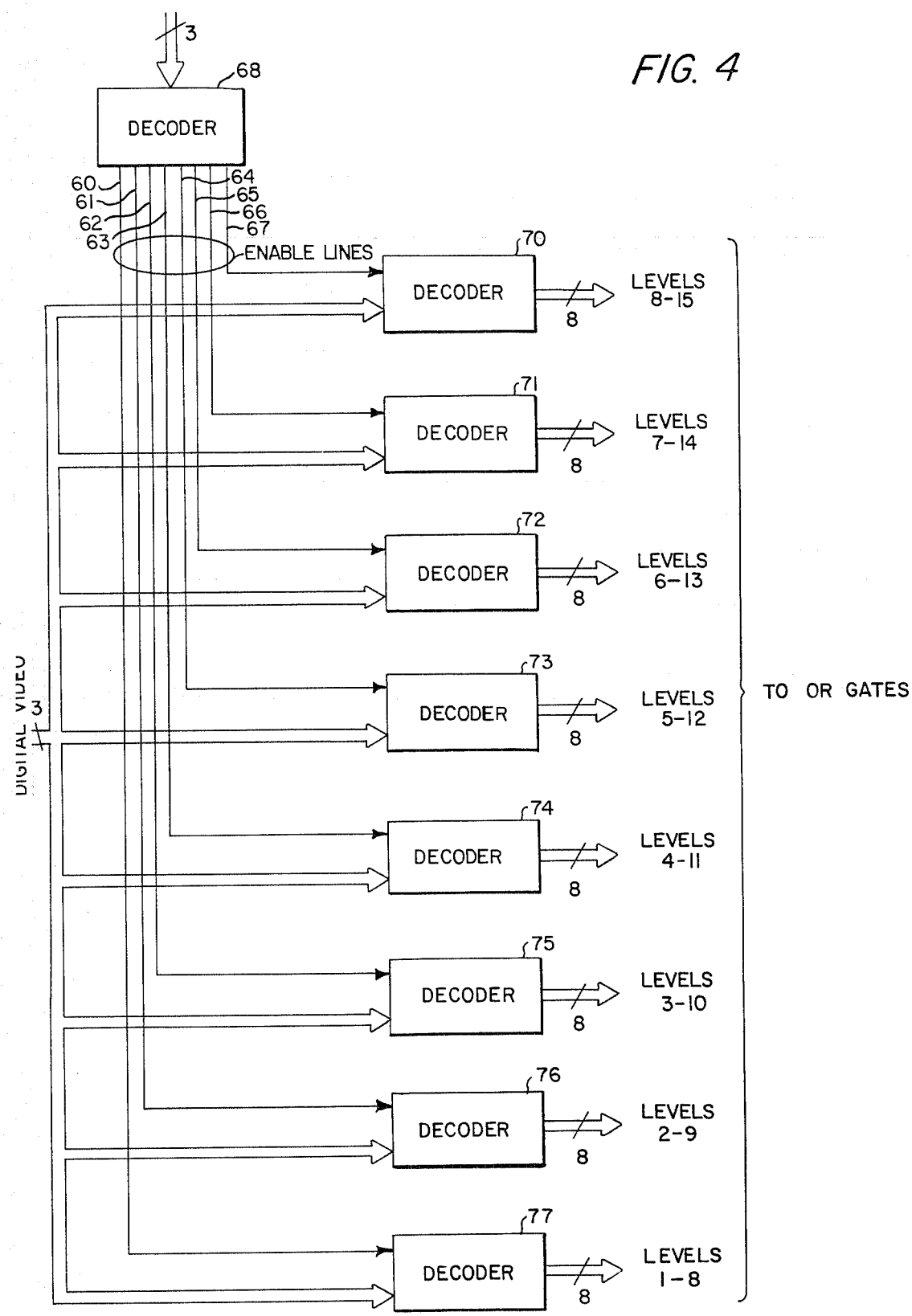
FIG. 4 is a schematic block diagram of an alternate embodiment of part of the schematic block diagram of FIG. 1.

Referring to FIG. 4, an alternate embodiment of part of the circuit of FIG. 1 is shown. The embodiment of FIG. 4 can be used for picture element rates of approximately 50 megacycles, a rate which would make the circuit to FIG. 1 impossible to implement because of the add times of typical adders. Still referring to FIG. 4, the digital video input is the same as that shown in FIG. 1 comprising three lines. Each line is connected to decoders 70-77. Also provided to each decoder is an enable line from brightness decoder 68. The input of brightness decoder 68 is the output of brightness encoder 20 as shown in FIG. 1. The brightness input code to brightness decoder 68 enables one of the eight output lines 60-67 which in turn enables one of decoders 70-77. Each of the decoders 70-77 has eight outputs, each of which corresponds to one of the 15 levels in the dynamic range at the output of decoder 32 of FIG. 1. These levels are labeled in FIG. 4. For example, decoder 70 provides levels 8-15, decoder 71 provides levels 7-14, etc. Identical level outputs from decoders 70-77 are ORed together in 15 OR gates (not shown). The outputs of these 15 OR gates are identical to the outputs of decoder 32 of FIG. 1 and accordingly are coupled to non-linear DAC 34. The increase in speed handling capability of the circuit of FIG. 4 over the circuit of FIG. 1 is realized by the elimination of 3-bit adder 16.

This completes the description of the preferred embodiments of the invention. Although preferred embodiments have been described, it is believed that numerous modifications and alterations thereto would be apparent to one having ordinary skill in the art without departing from the spirit and scope of the invention. Therefore, it is intended that the scope of the invention be limited only by the appended claims.

What is claimed is:

1. In combination:
    a cathode ray tube having a nonlinear transfer function;
    a first source of first digital signals corresponding to information to be displayed on said cathode ray tube at a plurality of gray shade levels;
    a second source of second digital signals corresponding to the intensity range over which said shade levels are to be displayed on said cathode ray tube;
    means for producing third digital signals which are a function of said first and said second digital signals; and
    a digital to analog converter coupled between said producing means and said cathode ray tube, said converter having an analog output having an amplitude related by a nonlinear transfer function to said third digital signals, said analog output providing gray shade level consecutive steps having substantially equal ratios of luminance of said chathode ray tube for a plurality of different said second digital signals.

2. The combination in accordance with claim 1 wherein said producing means comprises a digital adder.

3. The combination in accordance with claim 2 wherein said first source comprises a digital computer.

4. The combination in accordance with claim 3 wherein said producing means comprises digital-to-analog conversion means.

5. In combination:
    a cathode ray tube having a nonlinear transfer function;
    a first source of first digital signals corresponding to information to be displayed on said cathode ray tube at a plurality of gray shade levels;
    a second source of second digital signals corresponding to the intensity range over which said shade levels are to be displayed on said cathode ray tube;
    means for producing third digital signals which are sums of said first and second digital signals; and
    a digital to analog converter coupled between said producing means and said cathode ray tube, said converter having an analog output having an amplitude related by a nonlinear transfer function to said third digital signals, said analog output providing gray shade level consecutive steps having substantially equal ratios of luminance on said cathode ray tube for a plurality of different said second digital signals.

6. The combination in accordance with claim 5 wherein said producing means comprising a digital adder.

7. In combination:
a cathode ray tube display;
means responsive to digital video signals for producing a plurality of discrete intensity levels on said display; and
said producing means comprising means for maintaining the ratios of luminances of adjacent intensity levels constant for a plurality of different intensity level ranges.

8. The combination in accordance with claim 7 wherein said producing means further comprises a digital to analog converter, said converter having an analog output having an amplitude related by a non-linear transfer function to said digital video signals.

9. In combination:
a cathode ray tube display; and
means responsive to digital control signals for producing a plurality of discrete intensity levels on said display, said intensity level consecutive steps having substantially equal ratios of luminance for a plurality of display brightness settings.

10. In combination:
a cathode ray tube display;
means coupled to said display for converting a plurality of digital video control signals each corresponding to a display gray shade level to a plurality of analog signals each producing a different gray shade level on said display; and
said converting means having a transfer characteristic producing gray shade level consecutive steps having substantially equal ratios of luminance for a plurality of display brightness settings.

11. The combination in accordance with claim 10 wherein said converting means is coupled to the cathode of said cathode ray tube.

12. The combination in accordance with claim 11 wherein said display brightness setting control is coupled to said converting means.

13. A digitally controlled video display system comprising:
a cathode ray tube display;
means coupled to said display for deriving a plurality of analog video signals from a plurality of digital signals, each of said digital signals corresponding to a gray shade level to be displayed;
said analog video signals producing gray shade levels on said display, said gray shade level consecutive steps having substantially equal ratios of luminances;
said deriving means comprising a digital adder adapted for input of said digital video signals and brightness encoded digital signals; and
said deriving means further comprising means for converting the digital output signals of said adder to said analog signals.

14. The combination in accordance with claim 13 wherein said deriving means comprises means for maintaining said ratios of luminances equal for a plurality of said brightness encoded digital signals.

15. The combination in accordance with claim 14 wherein said deriving means is coupled to the cathode of said cathode ray tube.

16. A digitally controlled video display system comprising:
a cathode ray tube display;
a digital adder adapted for input of digital video control signals and brightness encoded digital signals;
means coupled to said adder for decoding the output of said adder;
means coupled between said decoding means and said display means for converting the output of said decoding means to a plurality of analog signals producing discrete gray shade levels on said display; and
said gray shade level consecutive steps having substantially equal ratios of luminances.

17. The combination in accordance with claim 16 wherein said converting means comprises means for maintaining said ratios of luminances equal for a plurality of said brightness encoded digital signals.

18. The combination in accordance with claim 17 wherein said converting means is coupled to the cathode of said cathode ray tube.

* * * * *

UNITED STATES PATENT OFFICE
CERTIFICATE OF CORRECTION

Patent No. 4,251,755  Dated February 17, 1981

Inventor(s) Joseph E. Bryden

It is certified that error appears in the above-identified patent and that said Letters Patent are hereby corrected as shown below:

Column 4, line 21: change "te" to --the--;

Column 6, line 40: change 2nd "of" to --on--;

Column 6, line 41: change "chathode" to --cathode--;

Column 7, line 4: change "comprising" to --comprises--.

Signed and Sealed this

First Day of September 1981

[SEAL]

Attest:

GERALD J. MOSSINGHOFF

Attesting Officer

Commissioner of Patents and Trademarks